US006876312B2

(12) United States Patent  
 Yu

(10) Patent No.: US 6,876,312 B2  
(45) Date of Patent: Apr. 5, 2005

(54) KEYBOARD WITH MULTI-FUNCTION KEYS

(75) Inventor: Ching-Chiang Yu, Keelung (TW)

(73) Assignee: Behavior Tech Computer Corporation, Taipei (TW)

( * ) Notice: Subject to any disclaimer, the term of this patent is extended or adjusted under 35 U.S.C. 154(b) by 274 days.

(21) Appl. No.: 09/900,894

(22) Filed: Jul. 10, 2001

(65) Prior Publication Data

US 2003/0011496 A1 Jan. 16, 2003

(51) Int. Cl.⁷ .............................................. H03M 11/00
(52) U.S. Cl. ...................... 341/20; 341/22; 345/163; 345/168; 345/172; D14/396; D14/402
(58) Field of Search .................... 345/163, 172, 345/168, 170; 341/20, 22, 23; 361/680; 356/71; D14/346, 402

(56) References Cited

U.S. PATENT DOCUMENTS

| | | | | | |
|---|---|---|---|---|---|
| 4,823,311 | A | * | 4/1989 | Hunter et al. | 708/144 |
| 5,119,078 | A | * | 6/1992 | Grant | 345/172 |
| 5,181,029 | A | * | 1/1993 | Kim | 341/20 |
| 5,228,791 | A | * | 7/1993 | Fort | 400/489 |
| 5,351,066 | A | * | 9/1994 | Rucker et al. | 345/168 |
| 5,426,449 | A | * | 6/1995 | Danziger | 345/168 |
| 6,081,207 | A | * | 6/2000 | Batio | 341/20 |
| 6,193,153 | B1 | * | 2/2001 | Lambert | 235/380 |
| 6,288,706 | B1 | * | 9/2001 | Leman | 345/168 |
| 6,353,472 | B1 | * | 3/2002 | Bault | 356/71 |
| 6,445,381 | B1 | * | 9/2002 | Chou | 345/168 |
| 6,647,133 | B1 | * | 11/2003 | Morita et al. | 382/124 |

FOREIGN PATENT DOCUMENTS

DE              4123442         *  1/1993

* cited by examiner

Primary Examiner—Albert K. Wong  
(74) Attorney, Agent, or Firm—Rosenberg, Klein & Lee

(57) ABSTRACT

This invention relates to a keyboard with multi-function keys are installed nearby the space bar to make it very convenient to use. The keyboard incorporates the multi-function keys, such as a scroll-control-ball which can move the screen from various directions, an up-down-left-right keys to control the position of the cursor, editing functions keys which provide such functions as cut, copy, paste, mark, recovery, scroll page, insert and delete to enable speedy editing. In addition to the above-mentioned function keys, the multi-function keys comprise a finger-print-identification function device to identify the user. Furthermore, the multi-function keys further comprise a liquid crystal display light to show the status of the numeral and upper and lower case.

2 Claims, 2 Drawing Sheets

KEYBOARD WITH MULTI-FUNCTION KEYS

FIELD OF THE INVENTION

This invention relates to a keyboard with multi-function keys, particular to a keyboard having multi-function keys which are installed nearby the position in which users thumbs are placed when they operate the keyboard to provide the ultimate convenience.

Conventional keyboard is provided with normal characters, numerals, F1 through F12 function keys and some other simple function keys, such as insert, delete, home, end, up, down, left and right as well as the numerals keys. Although these function keys furnish the users with somewhat of convenience, while operating the users unavoidably have to move their arms back and forth which sometimes causes some mistype. Moreover, by moving the arm to press the keyboards will slow down the speed of operation. Most of all the importance and frequency of use of these function keys vary with times and some of the important function keys are not implemented in conventional keyboard.

The main objective of the present invention is to provide a keyboard with multi-function keys which are installed very close to space bar. While using this multi-function keys, it is just as easy as to move the thumb. Besides, it is located in the area where the user vision is most likely to be. To those who familiar with the computer keyboard, this multi-functions keyboard will greatly enhance their operation speed. At the same time for those people who are not familiar with computer keyboard, since the multi-functions keyboard is right in front of them, it unquestionably increase the convenience of use.

The keyboard with multi-function keys of the invention comprises the most often-used scroll-control-ball. Despite the fact that the scroll function is used a lot when people operate the computer, most of the conventional computers install the scroll function inside of the mouse. Therefore it appear to us that it will be very helpful to implement the scroll function in the keyboard with multi-function keys. The keyboard with multi-function keys comprises keys of up, down, left and right which are built in a circular piece of board and is very easy to move the cursor. The keyboard with multi-function keys further comprises the most commonly-used editing keys such as cut, copy, paste, mark and recovery to enable editing as soon as possible.

Furthermore, the keyboard with multi-function keys of the invention comprises a finger-print-identification device. This finger-print-identification function device can replace the scroll-control ball. Meanwhile it also can be implemented by the side of the editing keys. With this special finger-print-identification function device, the computer system can easily identify the qualified user. Adding to the above-mentioned functions, by the outside edge of the editing keys a liquid crystal display light can be installed to show the digits and the status of upper and lower case.

DETAILED DESCRIPTION OF PREFERRED EMBODIMENTS

Figure 1:
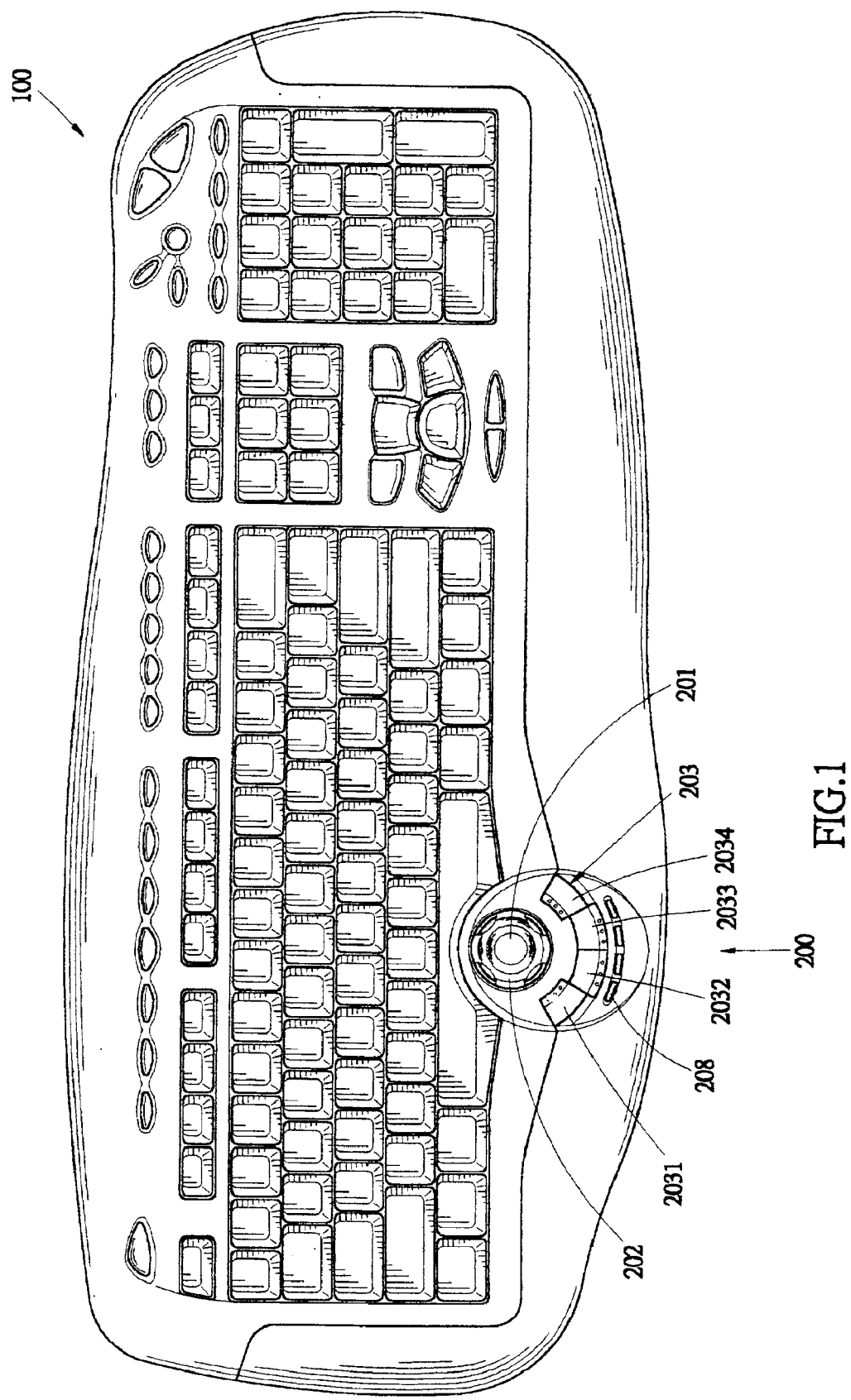
FIG. 1 shows the first preferred embodiment of the keyboard with multi-function keys of the invention.

As shown in FIG. 1, the keyboard with multi-function keys of the invention comprises one or more sets of multi-function keys 200 on the base of keyboard 100. The key set 200 includes various kinds of function keys. The key set 200 is installed nearby the space bar 101 to enable the user to operate the key set 200 conveniently with their thumb. Nevertheless it is fine to install it in other position. The key set 200 includes a scroll-control-ball 201. Most of time the scroll functions are incorporated in the mouse. As you may notice the chances to use the scroll functions are numerous. Therefore, a built-in scroll-control-ball 201 in the keyboard provide great convenience. The key set 200 further comprises contains UP, DOWN, LEFT and RIGHT keys 202 which provides four different ways of up, down, left and right control function keys. With this keys 202, it is quite easy to move the cursor. In addition, key set 200 also includes editing function keys 203. As shown in FIG. 1 there are function keys of cut 2031, function keys of copy 2032, function keys of paste 2033 and function keys of mark 2034. All these function keys are beneficial to the users in editing. Besides, these function keys are not normally shown in conventional keyboard. Its characteristics of easy-to-operate are self-explanatory. As to the other editing function keys 203, such as recovery, printing also can be built as necessary.

Figure 2:
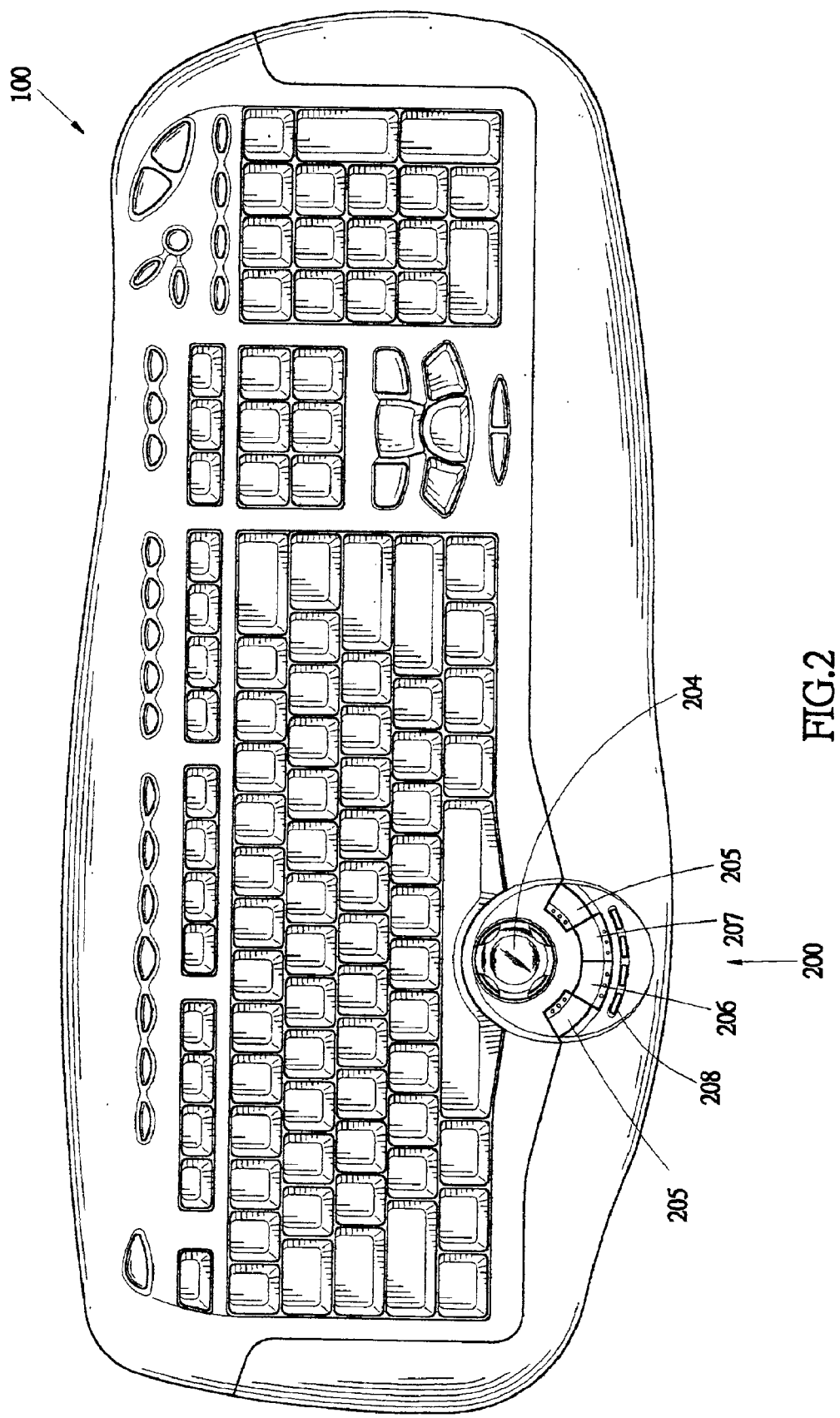
FIG. 2 shows the second preferred embodiment of the keyboard with multi-function keys of the invention.

Please refer to FIG. 2, the key set 200 of the invention contains a finger-print-identification function key 204. This finger-print-identification function key 204 can be in place of scroll-control-ball. It also can be built by the side of editing keys to effectively identify the users without requiring users keying in the common-used password. The key set 200 is designed with scrolling pages keys 205 to enable prompt scrolling of the pages, inserting keys 206 and deleting keys 207 to make a quick deletion. Furthermore, by the outside edge of 200 a liquid crystal display light can be installed to show the status of digits and upper and lower case. The status of the computer is transparently clear to the users.

The keyboard with multi-function keys can also comprise a function-exchange key (not shown in the figures), which is used to change the function of the above-mentioned keys. For example, UP, DOWN, LEFT and RIGHT keys can be change to a scroll-control keys by the function-exchange key which change the function of the key.

What is claimed is:

1. A keyboard with multi-function keys comprising:

a computer keyboard having a set of standard computer keys, said set of standard computer keys including a spacebar;

a scroll-control-ball mounted on said computer keyboard, said scroll-control-ball being positioned adjacent and contiguous to said spacebar, said spacebar being a single key of said keyboard and having a recess formed therein, said recess receiving a portion of said scroll-control-ball.

2. The keyboard with multi-function keys as recited in claim 1 wherein a liquid crystal display is mounted on said computer keyboard for displaying operational information.

* * * * *